United States Patent
Duan et al.

(10) Patent No.: US 12,487,789 B2
(45) Date of Patent: Dec. 2, 2025

(54) INFORMATION DISPLAY METHOD, DISPLAY DEVICE, ELECTRONIC DEVICE, AND COMPUTER-READABLE MEDIUM

(71) Applicant: BOE TECHNOLOGY GROUP CO., LTD., Beijing (CN)

(72) Inventors: Ran Duan, Beijing (CN); Xiaodong Shi, Beijing (CN); Youxiang Xia, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/016,408

(22) PCT Filed: Jan. 29, 2022

(86) PCT No.: PCT/CN2022/075047
§ 371 (c)(1),
(2) Date: Jan. 16, 2023

(87) PCT Pub. No.: WO2023/142056
PCT Pub. Date: Aug. 3, 2023

(65) Prior Publication Data
US 2024/0248669 A1 Jul. 25, 2024

(51) Int. Cl.
*G06F 3/14* (2006.01)
*G06F 3/01* (2006.01)
*G06F 3/033* (2013.01)
*G06F 3/04842* (2022.01)
*G06F 3/04845* (2022.01)

(52) U.S. Cl.
CPC ............ *G06F 3/1454* (2013.01); *G06F 3/013* (2013.01); *G06F 3/033* (2013.01); *G06F 3/04842* (2013.01); *G06F 3/04845* (2013.01); *G06F 2203/04806* (2013.01)

(58) Field of Classification Search
CPC ........ G06F 3/1454; G06F 3/013; G06F 3/033; G06F 3/04842; G06F 3/04845; G06F 2203/04806; G06F 3/0481; G06F 3/0484
See application file for complete search history.

(56) References Cited

U.S. PATENT DOCUMENTS 9,532,003 B2 12/2016 Inomata
2019/0289070 A1 9/2019 Gorgenyi et al.

FOREIGN PATENT DOCUMENTS

| CN | 103902218 A | 7/2014 |
| CN | 108399039 A | 8/2018 |
| CN | 105592042 B | 11/2018 |
| CN | 109167955 A | 1/2019 |
| CN | 109388329 A | 2/2019 |

*Primary Examiner* — Abhishek Sarma
(74) *Attorney, Agent, or Firm* — HOUTTEMAN LAW LLC (57) ABSTRACT

The present disclosure provides an information display method, a display device, an electronic device, and a computer-readable medium, the information display method including: in a case where a first display device displays content to be annotated, displaying annotation information corresponding to the content to be annotated, in response to an annotation operation for the content to be annotated; and sending the annotation information to a second display device, so that the second display device displays the annotation information in an area corresponding to the content to be annotated.

9 Claims, 5 Drawing Sheets

Determining a pre-selected area according to the maximum value of the X coordinate, the minimum value of the X coordinate, the maximum value of the Y coordinate, the minimum value of the Y coordinate in all the position coordinates, a preset X-direction threshold, and a preset Y-direction threshold ~ S1001

In a case where an aspect ratio of the pre-selected area is equal to the aspect ratio of the first display device, determining the pre-selected area as the area to be annotated ~ S1002

In a case where the aspect ratio of the pre-selected area is less than the aspect ratio of the first display device, determining a height of the pre-selected area as a height of the area to be annotated, and determining a width of the area to be annotated according to the height of the pre-selected area and the aspect ratio of the first display device ~ S1003

In a case where the aspect ratio of the pre-selected area is greater than the aspect ratio of the first display device, determining a width of the pre-selected area as the width of the area to be annotated, and determining the height of the area to be annotated according to the width of the pre-selected area and the aspect ratio of the first display device ~ S1004

INFORMATION DISPLAY METHOD, DISPLAY DEVICE, ELECTRONIC DEVICE, AND COMPUTER-READABLE MEDIUM

TECHNICAL FIELD

The present disclosure relates to the field of computer technology, and in particular, to an information display method for a first display device, an information display method for a second display device, a first display device, a second display device, an electronic device, and a computer-readable medium.

BACKGROUND

With the improvement of ultra-high definition display technology, more and more display devices are developing towards large size and high resolution, and the display devices of large size and high resolution are also more and more applied to scenes such as exhibition, conference explanation and the like.

In the process of interactive demonstration with the display device of large size and high resolution, if another screen is available for a presenter to interact with the display device of large size and high resolution, it will be more useful for the presenter to express the content he wants to explain.

SUMMARY

The embodiments of present disclosure provide an information display method for a first display device, an information display method for a second display device, a first display device, a second display device, an electronic device, and a computer-readable medium.

According to a first aspect of the present disclosure, it is provided an information display method for a first display device, including: displaying annotation information corresponding to content to be annotated, in response to an annotation operation for the content to be annotated, in a case where the first display device displays the content to be annotated; and sending the annotation information to a second display device, so that the second display device displays the annotation information in an area corresponding to the content to be annotated.

In some embodiments, before the displaying the annotation information corresponding to the content to be annotated, in response to the annotation operation for the content to be annotated, in the case where the first display device displays the content to be annotated, the method further includes: acquiring full-area display content of the second display device, and displaying the full-area display content on the first display device; taking selected content in the full-area display content as the content to be annotated, in response to a selection operation on the full-area display content, where the selection operation includes a gesture operation and is used for performing at least one of zooming in, zooming out and translation on content displayed by the first display device; and displaying the content to be annotated.

In some embodiments, before the taking the selected content in the full-area display content as the content to be annotated, in response to the selection operation on the full-area display content, the method further includes: acquiring gazing information for the full-area display content of the second display device, and displaying the gazing information on the first display device, where the gazing information is acquired by a sensor installed in the second display device and is used for indicating numbers of persons gazing on different display areas of the full-area display content displayed on the second display device.

In some embodiments, the method further includes: in response to the content to be annotated sent by the second display device, displaying the content to be annotated, where the content to be annotated is selected from the full-area display content of the second display device.

In some embodiments, a size of a screen of the first display device is less than a size of a screen of the second display device.

According to a second aspect of the present disclosure, it is provided an information display method for a second display device, including: displaying annotation information in an area corresponding to the content to be annotated on the second display device, in response to the annotation information for the content to be annotated, which annotation information is sent by a first display device, where the content to be annotated is content of a partial area in full-area display content of the second display device.

In some embodiments, before the displaying the annotation information in the area corresponding to the content to be annotated on the second display device, in response to the annotation information for the content to be annotated, which annotation information is sent by the first display device, the method further includes: displaying the full-area display content; in a case where a selection cursor is triggered, acquiring a plurality of display positions of the selection cursor in a first time period; determining an area to be annotated according to the plurality of display positions of the selection cursor, and taking display content in the area to be annotated as the content to be annotated; and sending the content to be annotated to the first display device, so that the first display device displays the content to be annotated, where the selection cursor is a cursor displayed on the second display device and controlled by a controller, the controller is used for controlling the display position of the selection cursor on the second display device, the controller includes a selection state, and the first time period is a time period between a start moment and an end moment of the selection state of the controller.

In some embodiments, the determining the area to be annotated according to the plurality of display positions of the selection cursor, includes: acquiring position coordinates in a first coordinate system corresponding to the plurality of display positions of the selection cursor, where an X direction of the first coordinate system is a column direction of pixels of the second display device, and a Y direction of the first coordinate system is a row direction of pixels of the second display device; and determining the area to be annotated according to a maximum value of an X coordinate, a minimum value of the X coordinate, a maximum value of a Y coordinate, and a minimum value of the Y coordinate in all the position coordinates, and an aspect ratio of the first display device.

In some embodiments, the determining the area to be annotated according to the maximum value of the X coordinate, the minimum value of the X coordinate, the maximum value of the Y coordinate, and the minimum value of the Y coordinate in all the position coordinates, and the aspect ratio of the first display device, includes: determining a pre-selected area according to the maximum value of the X coordinate, the minimum value of the X coordinate, the maximum value of the Y coordinate and the minimum value of the Y coordinate in all the position coordinates, a preset X-direction threshold and a preset Y-direction threshold; in a case where an aspect ratio of the pre-selected area is equal to the aspect ratio of the first display device, determining the pre-selected area as the area to be annotated; in a case where the aspect ratio of the pre-selected area is less than the aspect ratio of the first display device, determining a height of the pre-selected area as a height of the area to be annotated, and determining a width of the area to be annotated according to the height of the pre-selected area and the aspect ratio of the first display device; and in a case where the aspect ratio of the pre-selected area is greater than the aspect ratio of the first display device, determining a width of the pre-selected area as the width of the area to be annotated, and determining the height of the area to be annotated according to the width of the pre-selected area and the aspect ratio of the first display device.

In some embodiments, the determining the pre-selected area according to the maximum value of the X coordinate, the minimum value of the X coordinate, the maximum value of the Y coordinate, and the minimum value of the Y coordinate of all the position coordinates, the preset X-direction threshold and the preset Y-direction threshold, includes: determining the maximum value of the X coordinate, the minimum value of the X coordinate, the maximum value of the Y coordinate and the minimum value of the Y coordinate of the position coordinates corresponding to the pre-selected area in the first coordinate system, according to the following formulas: if $X_{min} - X_{threshold} \geq 0$, then $X_1 = X_{min} - X_{threshold}$; if $X_{min} - X_{threshold} < 0$, then $X_1 = 0$; if $X_{max} + X_{threshold} \leq X_{height}$, then $X_2 = X_{max} + X_{threshold}$; if $X_{max} + X_{threshold} > X_{height}$, then $X_2 = X_{width}$; if $Y_{min} - Y_{threshold} \geq 0$, then $Y_1 = Y_{min} - Y_{threshold}$; if $Y_{min} - Y_{threshold} < 0$, then $Y_1 = 0$; if $Y_{max} + Y_{threshold} \leq Y_{width}$, then $Y_2 = Y_{max} + Y$ threshold; if $Y_{max} + Y_{threshold} > Y_{weight}$, then $Y_2 = Y_{width}$, where $X_{min}$, $X_{max}$, $Y_{min}$, and $Y_{max}$ are the minimum value of the X coordinate, the maximum value of the X coordinate, the minimum value of the Y coordinate and the maximum value of the Y coordinate in all the position coordinates corresponding to the plurality of display positions of the selection cursor in the first coordinate system, respectively; $X_1$, $X_2$, $Y_1$, and $Y_2$ are an minimum value of the X coordinate, an maximum value of the X coordinate, a minimum value of the Y coordinate and a maximum value of the Y coordinate of position coordinates corresponding to the area to be annotated in the first coordinate system, respectively; and $X_{threshold}$ is the preset X-direction threshold, $Y_{threshold}$ is the preset Y-direction threshold, and both $X_{threshold}$ and $Y_{threshold}$ are positive integers; $X_{height}$ is a height of the second display device, and $Y_{width}$ is a width of the second display device.

In some embodiments, in the case where the aspect ratio of the pre-selected area is less than the aspect ratio of the first display device, the determining the height of the pre-selected area as the height of the area to be annotated, and determining the width of the area to be annotated according to the height of the pre-selected area and the aspect ratio of the first display device, includes: determining the width of the area to be annotated according to the following formula: Width=$Y_2 - Y_1 + Y_{complement}$; where $Y_{complement} = (X_2 - X_1) \times R_{first\ display\ device} - (Y_2 - Y_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of position coordinates corresponding to the area to be annotated in the first coordinate system, respectively; and in a case where the aspect ratio of the pre-selected area is greater than the aspect ratio of the first display device, determining the width of the pre-selected area as the width of the area to be annotated, and determining the height of the area to be annotated according to the width of the pre-selected area and the aspect ratio of the first display device, includes: Height=$X_2 - X_1 + X_{complement}$; where $X_{complement} = (Y_2 - Y_1)/R_{first\ display\ device} - (X_2 - X_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of the position coordinates corresponding to the area to be annotated in the first coordinate system, respectively.

In some embodiments, the controller controls the position of the selection cursor on the second display device by means of infrared or bluetooth, the controller is provided with a button, and when the button is pressed, the controller is in the selection state.

According to a third aspect of the present disclosure, it is provided a first display device including: an annotation module configured to display annotation information corresponding to content to be annotated, in response to an annotation operation for the content to be annotated, in a case where the first display device displays the content to be annotated; and a communication module configured to send the annotation information to a second display device, so that the second display device displays the annotation information in an area corresponding to the content to be annotated.

According to a fourth aspect of the present disclosure, it is provided a second display device including: a display module configured to display annotation information in an area corresponding to content to be annotated on the second display device, in response to the annotation information, which is for the content to be annotated and sent by a first display device, where the content to be annotated is content of a partial area in full-area display content of the second display device.

According to a fifth aspect of the present disclosure, it is provided an electronic device, including: at least one processor; and a memory communicating with and connected to the at least one processor, where the memory stores one or more computer programs executable by the at least one processor, and when the one or more computer programs are executed by the at least one processor, the at least one processor performs the information display method for a first display device and/or the information display method for a second display device, which are described above.

According to a sixth aspect of the present disclosure, it is provided a non-transitory computer-readable storage medium with a computer program stored thereon, when the computer program is executed by a processor, the computer program implements the information display method for a first display device and/or the information display method for a second display device, which are described above.

BRIEF DESCRIPTION OF DRAWINGS

The accompanying drawings, which are included to provide a further understanding of the present disclosure and constitute a part of this specification, serve to explain the present disclosure together with the following specific embodiments, but do not constitute a limitation to the present disclosure. In the drawings.

DETAIL DESCRIPTION OF EMBODIMENTS

In order to make one of ordinary skill in the art better understand the technical solution of the embodiments of the present disclosure, an information display method for a first display device, an information display method for a second display device, a first display device, a second display device, an electronic device, and a computer-readable medium provided in the embodiments of the present disclosure will be clearly and completely described below with reference to the accompanying drawings.

Example embodiments will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The term used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the term(s) "comprise" and/or "include", when used in this specification, may specify the presence of stated features, integers, steps, operations, elements, and/or components, but do not preclude the presence or addition of one or more other features, integers, steps, operations, elements, components, and/or groups thereof.

It will be understood that, although the terms "first", "second", etc. may be used herein to describe various elements/structures, these elements/structures, should not be limited by these terms. These terms are only used to distinguish one element/structure, from another element/structure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the related art, a mobile terminal used by a presenter may display content corresponding to that of the display of a large-size display terminal, and the presenter may operate a mobile terminal of his own, for example, operate on a screen through a touch control (for example, annotate currently displayed content). When the content displayed by the mobile terminal changes or an operation instruction is triggered, the mobile terminal may synchronize the changed content or the operation instruction to the large-size display terminal in a wireless manner or the like, so as to implement a control over the large-size display terminal.

However, since a resolution difference exists between the large-size display terminal and the mobile terminal, on one hand, if a resolution of the mobile terminal owned by the presenter is relatively low, and the content displayed by the large-size display terminal is directly displayed on the mobile terminal owned by the presenter, the content displayed by the large-size display terminal inevitably needs to be zoomed in/out, and instead, which is not beneficial for the presenter to perform a fine operation; on the other hand, each time the presenter operates, the large-size display terminal and the mobile terminal owned by the presenter need to perform information transmission in a wireless manner or the like, so that higher requirements are raised on the network bandwidth, and when the network bandwidth cannot meet the requirements, the large-size display terminal and the mobile terminal owned by the presenter cannot be synchronized in real time, and the experience is influenced.

In view of the above, the embodiments of the present disclosure provide an information display method for a first display device, an information display method for a second display device, a first display device, a second display device, an electronic device, and a computer-readable medium.

Figure 1:
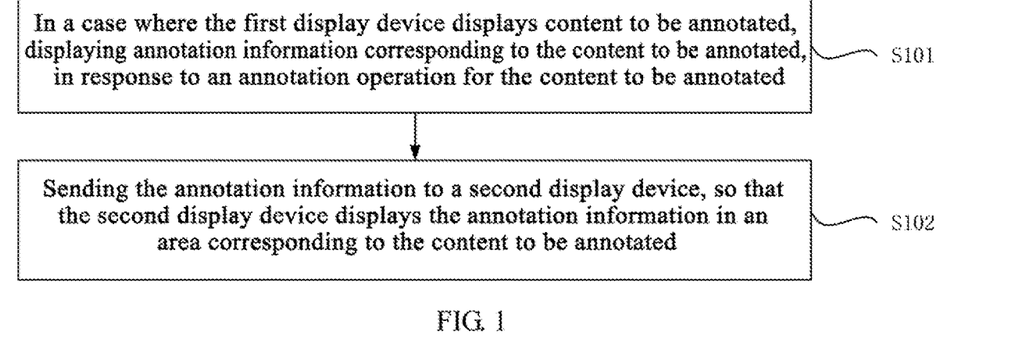
FIG. 1 is a schematic flowchart illustrating an information display method for a first display device according to an embodiment of the present disclosure.

FIG. 1 is a schematic flowchart illustrating an information display method for a first display device according to an embodiment of the present disclosure.

Referring to FIG. 1, the information display method for a first display device according to the embodiment of the present disclosure specifically includes steps S101 and S102.

In step S101, in a case where the first display device displays content to be annotated, displaying annotation information corresponding to the content to be annotated, in response to an annotation operation for the content to be annotated;

In step S102, sending the annotation information to a second display device, so that the second display device displays the annotation information in an area corresponding to the content to be annotated.

The first display device may be a display device owned by a presenter, and may be a mobile terminal such as a computer, a tablet computer or a mobile phone which is convenient for the presenter to operate on a screen. The second display device may be a display terminal with a large size and a high resolution. The content to be annotated may be a part of full-area display content of the second display device. The annotation operation includes writing a note and triggering an operation instruction, such as selecting a specific function key.

For example, in step S101, in a case where the first display device displays the content to be annotated, the presenter may perform the annotation operation on the content to be annotated through the first display device, and the first display device displays the corresponding annotation information in the area corresponding to the content to be annotated, in response to the operation.

In some embodiments, the first display device is a computer terminal, and the presenter may perform the annotation operation on the content to be annotated through a mouse. In some embodiments, the first display device is a tablet computer or a mobile phone, and the presenter may use a finger to directly operate on the screen of the first display device, so as to implement the annotation operation on the content to be annotated.

In step S102, the first display device synchronizes the annotation information to the second display device, and after receiving the annotation information, the second display device displays the annotation information in the area corresponding to the content to be annotated, which is displayed by the second display device.

In some embodiments, a size of a screen of the first display device is less than a size of a screen of the second display device. Obviously, the first display device is a device for the presenter to annotate, which should be more convenient for the presenter to annotate. If the screen of the first display device is too large, the presenter may need to move to complete the annotation, thereby reducing the efficiency of the annotation of the presenter. The second display device is a device for others to watch the annotation, which should be large enough to ensure that the audience can clearly obtain the detail of the annotation.

In some embodiments, when the first display device synchronizes the annotation information to the second display device, the first display device may send the new content composed of the content to be annotated and the corresponding annotation information to the second display device in a wireless manner or the like. That is, after the first display device displays the annotation information, the first display device sends the content currently displayed by the first display device to the second display device in a wireless manner or the like. After receiving the content sent by the first display device, the second display device may directly replace the content to be annotated displayed by the second display device with the received content, to implement displaying the annotation information in the area corresponding to the content to be annotated.

In some embodiments, the first display device provides annotation attribute options, such as a pen, a thickness degree, a color, and the like, for the presenter to select. After the presenter selects the annotation attributes, the first display device may directly send the annotation attributes to the second display device. When the presenter annotates (for example, modifies and marks) on the first display device, the first display device may transmit only a track of the annotation to the second display device in real time, and the second display device displays, by means of the received annotation attributes, the track of the annotation at positions corresponding to the track of the annotation in the content to be annotated, according to the received track. That is, the second display device displays the annotation information, so that other persons can watch the annotation information in the second display device.

In the information display method according to the embodiment of the present disclosure, the first display device may not display the full-area display content of the second display device, but display only the content to be annotated, which is convenient for the presenter to annotate the content to be annotated on the second display device. In addition, in the process of sending the annotate information to the second display device, the first display device may send only the annotate information, and it does not need to send the new content composed of the full-area display content and the corresponding annotate information, thereby greatly reducing the requirement on the transmission bandwidth, and being beneficial to solving the bandwidth bottleneck problem in the transmission process, so that the annotate information can be smoothly displayed on the second display device, and the user experience is improved.

Figure 2:
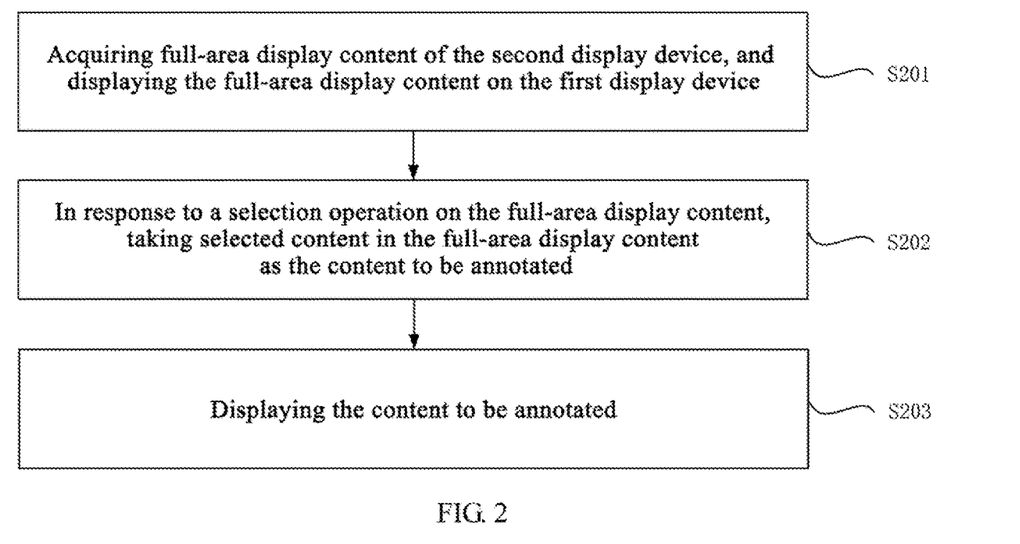
FIG. 2 is a schematic flowchart illustrating some steps of an information display method for a first display device according to an embodiment of the present disclosure.

In some embodiments, referring to FIG. 2, in the case where the first display device displays the content to be annotated, the steps S201, S202, S203 are further included before the step (step S101) of displaying the corresponding annotation information in response to the annotation operation for the content to be annotated.

In step S201, acquiring full-area display content of the second display device, and displaying the full-area display content on the first display device;

In step S202, in response to a selection operation on the full-area display content, taking selected content in the full-area display content as the content to be annotated; In step S203, displaying the content to be annotated.

The selection operation includes a gesture operation and is used for performing at least one of zooming in, zooming out and translation on the content displayed by the first display device.

For example, the selection operation may include touching the screen with a single finger, which gesture may be used to locate a starting point of coordinates of the selected area.

The selection operation may further include touching the screen with two fingers, which gesture may be used for selection. An action of gathering the two fingers, which are separated from each other, on the screen represents that the content displayed on the screen of the first display device covers a larger display range, and it is shown that the displayed content is zoomed out as a whole. An action of separating the two fingers, which are gathered together, on the screen represents that the content displayed on the screen of the first display device covers a smaller display range, and it is shown that the displayed content is zoomed in as a whole.

The selection operation may further include touching on the screen with three fingers, which gesture is used to represent a translation of the content displayed on the screen of the first display device as a whole.

In step S201, the second display device transmits the full-area display content to the first display device through a wireless screen projection technology, or the like, and the first display device displays the full-area display content.

In step S202, the operator selects the content to be annotated from the full-area display content by performing the selection operation on the first display device.

In the process of selecting the content to be annotated, when the position of a selection cursor (namely the starting point of coordinates of the selected area) cannot be accurately positioned due to the small size of the screen of the first display device, the position of the selection cursor may be positioned by touching the screen with a single finger (namely clicking the screen). When the content displayed on the screen of the first display device is too much, which is not beneficial for an accurate selection, the displayed content may be zoomed in by separating the two fingers gathered together on the screen. When an error occurs during zooming in, and the screen needs to be zoomed out, the displayed content may be zoomed out by gathering the two fingers separated from each other. When the displayed content needs to be finely adjusted, the displayed content may be translated with 3 fingers.

It should be emphasized that, in the process of selecting the content to be annotated by the operator through the selection operation performed on the first display device, the content displayed by the first display device is not synchronized to the second display device, the second display device still displays the full-area display content, and the content displayed by the second display device does not change until the annotation information is received.

In step S203, after the content to be annotated is selected, the first display device displays the content to be annotated, waiting the presenter to perform annotation operation on the content to be annotated.

The first display device provides annotation attribute options, such as a pen, a thickness degree, a color, and the like, for the presenter to select. After the presenter selects the annotation attributes, the first display device may directly send the annotation attributes to the second display device. When the presenter performs the annotation operation on the first display device, the first display device may transmit the track of the annotation to the second display device in real time, and with the received annotation attributes, the second display device displays the track of the annotation at positions corresponding to the track of the annotation in the content to be annotated, according to the received track. That is, the second display device displays the annotation information.

The presenter selects the content to be annotated through the first display device, which can solve the problem of selecting the area to be annotated when the presenter cannot operate the second display device due to a long distance to the second display device or a certain obstacle between the presenter and the second display device. Further, in the process of selecting the content to be annotated, the contents displayed by the second display device are not changed, so that an attention of other persons to the full-area display content may not be influenced.

Figure 3:
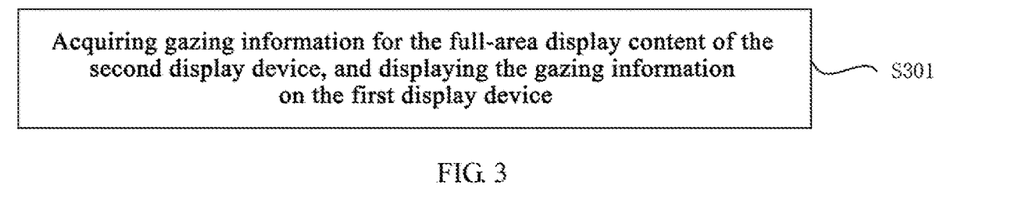
FIG. 3 is a schematic flowchart illustrating some steps of an information display method for a first display device according to an embodiment of the present disclosure.

In some embodiments, referring to FIG. 3, before the step (step S202) of taking the selected content in the full-area display content as the content to be annotated, in response to the selection operation on the full-area display content, a step 301 may be further included.

In step S301, acquiring gazing information for the full-area display content of the second display device, and displaying the gazing information on the first display device.

The gazing information is acquired by a sensor (e.g., an eye movement capturing apparatus) installed in the second display device, and is used for indicating numbers of persons gazing on different display areas of the full-area display content displayed on the second display device. The eye movement capturing apparatus is an apparatus manufactured according to the operating principle of an eye tracker, and may acquire specific gazing areas of the persons who gaze on the second display device. The operating principle of the eye movement capturing apparatus is not limited in the embodiment of the present disclosure.

For example, when the presenter needs to know which areas of the second display device are gazed on by the viewers, the areas where all the persons gaze may be counted by the eye movement capturing apparatus installed in the second display device. After the counting is completed, the numbers of persons gazing on different display areas may be represented by red, yellow and green, respectively. For example, the red area represents that more than 30 persons gaze on the area, the yellow area represents that 15 to 30 persons gaze on the area, and the green area represents that less than 15 persons gaze on the area.

After the eye movement capturing apparatus acquires the gazing information, the eye movement capturing apparatus may send the acquired information to the first display device, and the first display device displays the gazing information in the full-area display content on the basis of displaying the full-area display content. The presenter may perform the selection operation on the full-area display content according to the gazing information, to select the content to be annotated.

When the first display device displays the gazing information, the gazing information may be displayed with different colors of red, yellow, green, and the like. The presenter may visually acquire the numbers of persons gazing on the area and the level of interest on the area according to the colors of the different areas.

When the presenter wants to annotate a certain gazed area, the presenter may select the gazed area. The first display device selects a view frame of a fixed-size (such as 1920× 1080), taking the center point of the area as the center of the view frame, and the first display device displays the content in the view frame. The presenter finely adjusts the content in the view frame through gestures, and performs the selection operation through gestures, to select the content to be annotated from the content in the view frame.

After the content to be annotated is selected, the first display device provides annotation attribute options, such as a pen, a thickness degree, a color, and the like, for the presenter to select. After the presenter selects the annotation attributes, the first display device may directly send the annotation attributes to the second display device. When the presenter performs the annotation attribute on the first display device, the first display device may transmit the track of the annotation to the second display device in real time, and the second display device displays, by means of the received annotation attributes, the track of the annotation at positions corresponding to the track of the annotation in the content to be annotated, according to the received track. That is, the second display device displays the annotation information.

Figure 4:
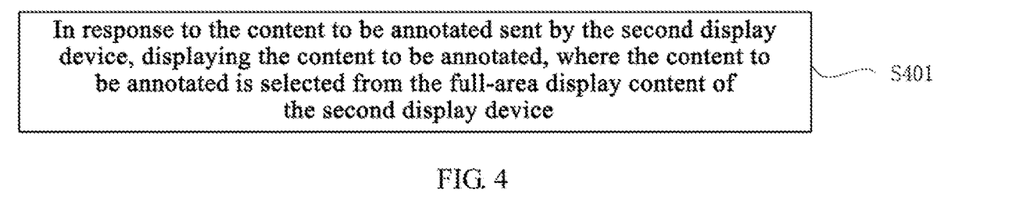
FIG. 4 is a schematic flowchart illustrating some steps of an information display method for a first display device according to an embodiment of the present disclosure.

In some embodiments, referring to FIG. 4, the content to be annotated may be sent by the second display device to the first display device for display, and the information display method according to the embodiment of the present disclosure may further include step S401.

In step S401, in response to the content to be annotated sent by the second display device, displaying the content to be annotated, where the content to be annotated is obtained by selecting from the full-area display content of the second display device.

For example, the presenter may select the content to be annotated on the second display device, and the second display device sends only the content to be annotated to first display device after the content to be annotated is determined. The presenter may perform the annotation operation on the content to be annotated through the first display device, in a case where the first display device displays the content to be annotated. In response to the operations, the first display device displays the corresponding annotation information on the content to be annotated and synchronizes the annotation information to the second display device. The second display device displays the annotation information in the content to be annotated displayed on the second display device after receiving the annotation information.

The second display device determines the content to be annotated, so that the second display device may send only the content to be annotated to the first display device without sending the full-area display content. The content to be annotated is a part of the full-area display content, and the bandwidth required during transmission of the content to be annotated is obviously less than that required for the full-area display content, so that the requirement on the transmission bandwidth is further reduced.

Figure 5:
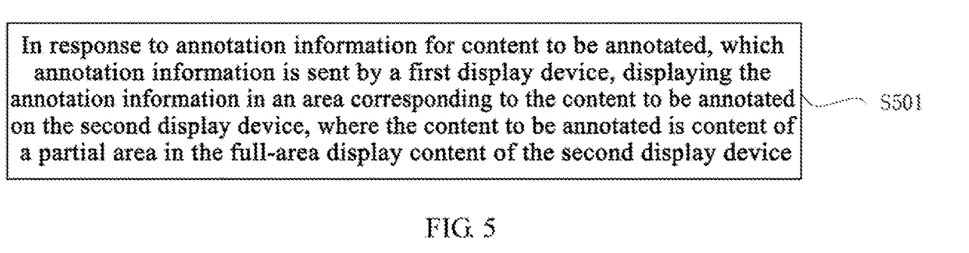
FIG. 5 is a schematic flowchart illustrating an information display method for a second display device according to an embodiment of the present disclosure.

FIG. 5 is a flowchart illustrating an information display method for a second display device according to an embodiment of the present disclosure.

Referring to FIG. 5, the information display method for a second display device according to the embodiment of the present disclosure specifically includes step S501.

In step S501, in response to annotation information, which is for content to be annotated and sent by a first display device, displaying the annotation information in an area corresponding to the content to be annotated on the second display device, where the content to be annotated is content of a partial area in the full-area display content of the second display device.

The first display device may be a display device owned by a presenter, and may be a mobile terminal such as a computer, a tablet computer or a mobile phone which is convenient for the presenter to operate on a screen. The second display device may be a display terminal with a large size and a high resolution. The content to be annotated may be content of the partial area in the full-area display content of the second display device.

For example, in a case where the first display device displays the content to be annotated, the presenter may perform annotation operation on the content to be annotated through the first display device, and the first display device displays the corresponding annotation information on the content to be annotated in response to the operations. The first display device synchronizes the annotation information to the second display device, and the second display device displays the annotation information in the area corresponding to the content to be annotated, which is displayed by the second display device, after receiving the annotation information.

In some embodiments, the annotation information received by the second display device may be annotation attributes and track information. The annotation attributes include a pen, a thickness degree, a color, and the like, and may be sent to the second display device immediately after the presenter selects the annotation attribute. The track information may be sent in real time during the presenter annotates (for example, modifies and marks) on the first display device, and the second display device displays, by means of the received annotation attributes, the track of the annotation at positions corresponding to the track of the annotation in the content to be annotated, according to the track received in real time. Thus, displaying the annotation information is completed, so that other persons can watch the annotation information in the second display device.

In the information display method according to the embodiment of the present disclosure, the first display device may not display the full-area display content of the second display device, but display only the content to be annotated, which is convenient for the presenter to annotate the content to be annotated on the second display device. In addition, in the process of sending the annotate information to the second display device, the first display device may send only the annotate information, and it does not need to send the new content composed of the full-area display content and the corresponding annotate information, thereby greatly reducing the requirement on the transmission bandwidth, and being beneficial to solving the bandwidth bottleneck problem in the transmission process, so that the annotate information can be smoothly displayed on the second display device, and the user experience is improved.

Figure 6:
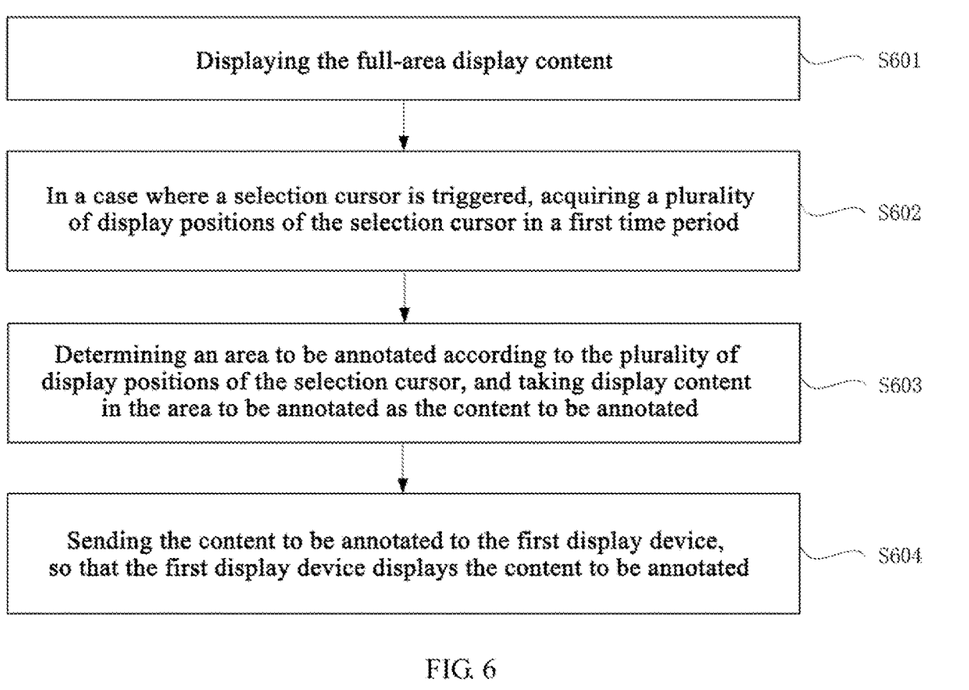
FIG. 6 is a schematic flowchart illustrating some steps of an information display method for a second display device according to an embodiment of the present disclosure.

In some embodiments, referring to FIG. 6, before the step of displaying the annotation information in the content to be annotated on the second display device, in response to the annotation information, which is for the content to be annotated and sent by the first display device, the method further includes steps S601, S602, S603, and S604.

In step S601, displaying the full-area display content;

In step S602, in a case where a selection cursor is triggered, acquiring a plurality of display positions of the selection cursor in a first time period;

In step S603, determining an area to be annotated according to the plurality of display positions of the selection cursor, and taking display content in the area to be annotated as the content to be annotated;

In step S604, sending the content to be annotated to the first display device, so that the first display device displays the content to be annotated.

The selection cursor is a cursor displayed on the second display device and controlled by a controller, which is used for controlling the display position of the selection cursor on the second display device. The controller includes a selection state, and the first time period is a time period between a start moment and an end moment of the selection state of the controller.

Figure 7:
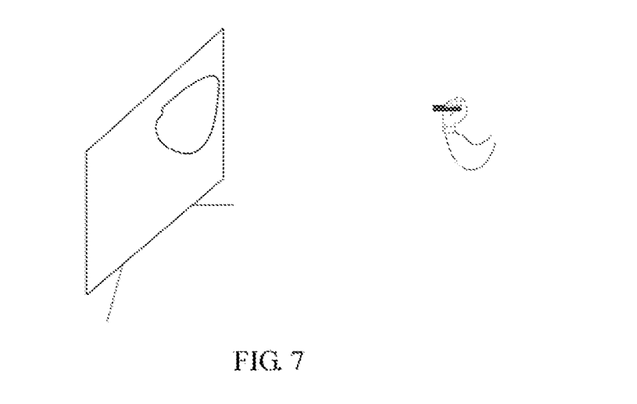
FIG. 7 is a schematic diagram illustrating some steps of an information display method for a second display device according to an embodiment of the present disclosure.

In some embodiments, the controller controls the display position of the selection cursor on the second display device by means of infrared or bluetooth. Referring to FIG. 7, the controller (an apparatus held by a hand, as shown in FIG. 7) is provided with a button, which may be specifically located at the tail of the controller. When the button is pressed, the controller is in the selection state, and the first time period is a time period from the moment when the button of the controller is pressed to the moment when the button of the controller is released.

In step S602, referring to FIG. 7, when the presenter wishes to select the content to be annotated through the controller, the presenter may press the button of the controller, and the selection cursor of the second display device is triggered. The presenter keeps pressing the button of the controller, without releasing the button. During the time period (i.e. the first time period) in which the button of the controller is pressed, the controller is operated to realize the movement of the selection cursor (an irregular figure in the screen shown in FIG. 7 is a movement track of the selection cursor controlled by the controller), and the second display device obtains a plurality of display positions (i.e. positions of the irregular figure in the screen shown in FIG. 7) of the selection cursor in the time period in which the button of the controller is pressed.

In step S603, the second display device determines the area to be annotated according to the plurality of acquired display positions of the selection cursor, and takes the display content in the area to be annotated as the content to be annotated.

In step S604, the second display device sends the content to be annotated to the first display device. The first display device displays the content to be annotated after receiving the content to be annotated, and the presenter may annotate the content to be annotated on the first display device. The first display device generates the annotation information according to the annotation of the presenter and sends the annotation information to the second display device, and the second display device displays the annotation information in the content to be annotated.

the content to be annotated is determined through the controller on the second display device, so that the second display device may send only the content to be annotated to the first display device without sending the full-area display content. The content to be annotated is a part of the full-area display content, and the bandwidth required during transmission of the content to be annotated is obviously less than that required for the full-area display content, so that the requirement on the transmission bandwidth is further reduced.

Figures 8, 9:
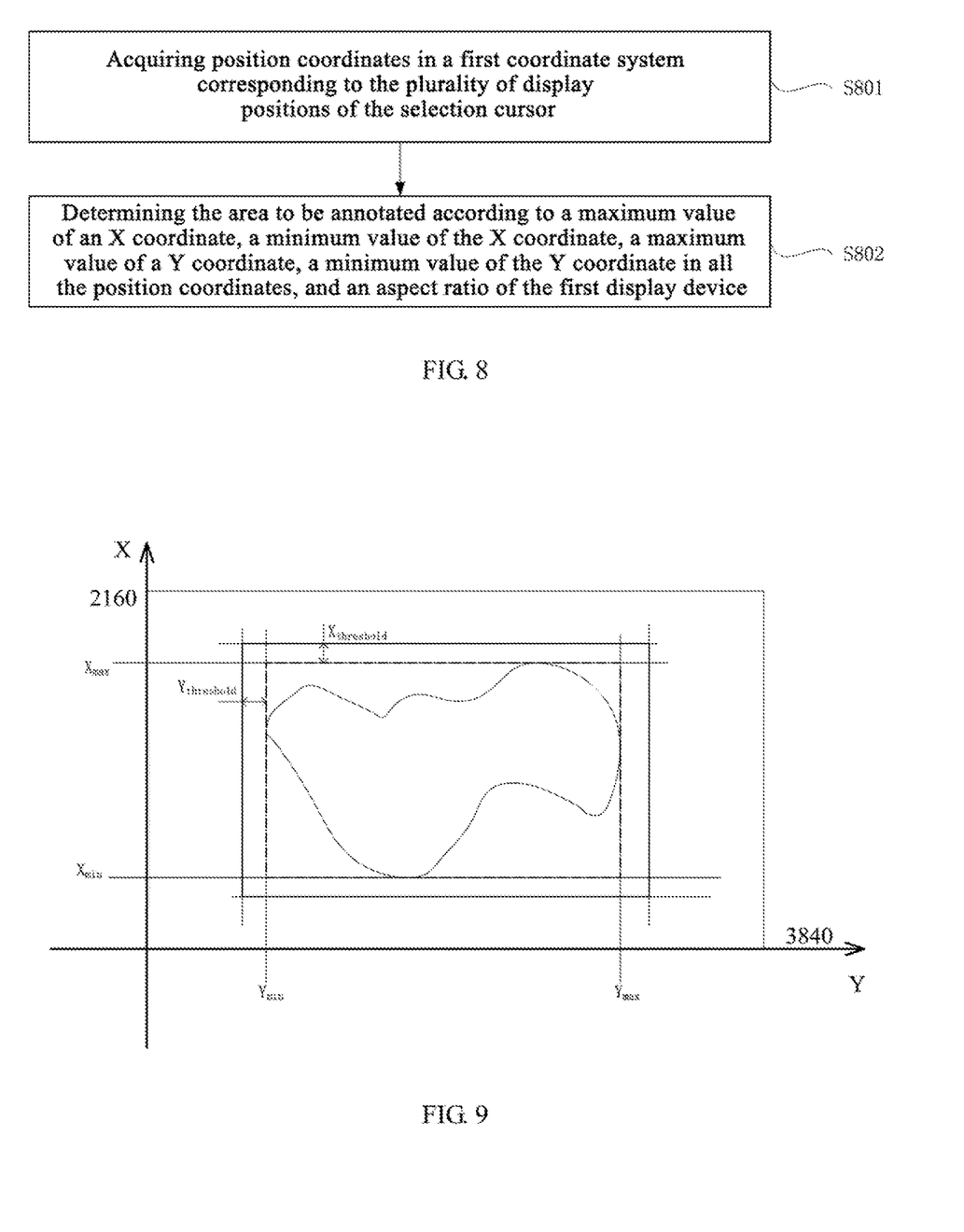
FIG. 8 is a schematic flowchart illustrating some steps of an information display method for a second display device according to an embodiment of the present disclosure.
FIG. 9 is a schematic diagram illustrating a plurality of display positions of a selection cursor in a first coordinate system.

In some embodiments, referring to FIG. 8, the step (step S603) of determining the area to be annotated according to the plurality of display positions of the selection cursor further includes steps S801 and S802.

In step S801, acquiring position coordinates corresponding to the plurality of display positions of the selection cursor in a first coordinate system;

In step S802, determining the area to be annotated according to a maximum value of an X coordinate, a minimum value of the X coordinate, a maximum value of a Y coordinate, a minimum value of the Y coordinate in all the position coordinates, and an aspect ratio of the first display device.

Referring to FIG. 9, an X direction of the first coordinate system is the column direction of pixels of the second display device, and a Y direction of the first coordinate system is the row direction of pixels of the second display device. Taking the screen of the second display device being a 4K screen as an example, the position coordinate may be maximally 2160 in the X direction, and maximally 3840 in the Y direction.

In step S801, the display position of the selection cursor may be captured in real time, and the position coordinate corresponding to the display position in the first coordinate system may also be acquired through real-time conversion. After the presenter finishes selecting, i.e. releases the button controlled by the presenter, the second display device finds the maximum value in the X direction (i.e. the maximum value of the X coordinate), the minimum value in the X direction (i.e. the minimum value of the X coordinate), the maximum value in the Y direction (i.e. the maximum value of the Y coordinate), and the minimum value in the Y direction (i.e. the minimum value of the Y coordinate) in these position coordinates. As shown in FIG. 9, the maximum value of the X coordinate, the minimum value of the X coordinate, the maximum value of the Y coordinate, and the minimum value of the Y coordinate may form a rectangle (a rectangle of a dashed box in FIG. 9).

Figure 10:
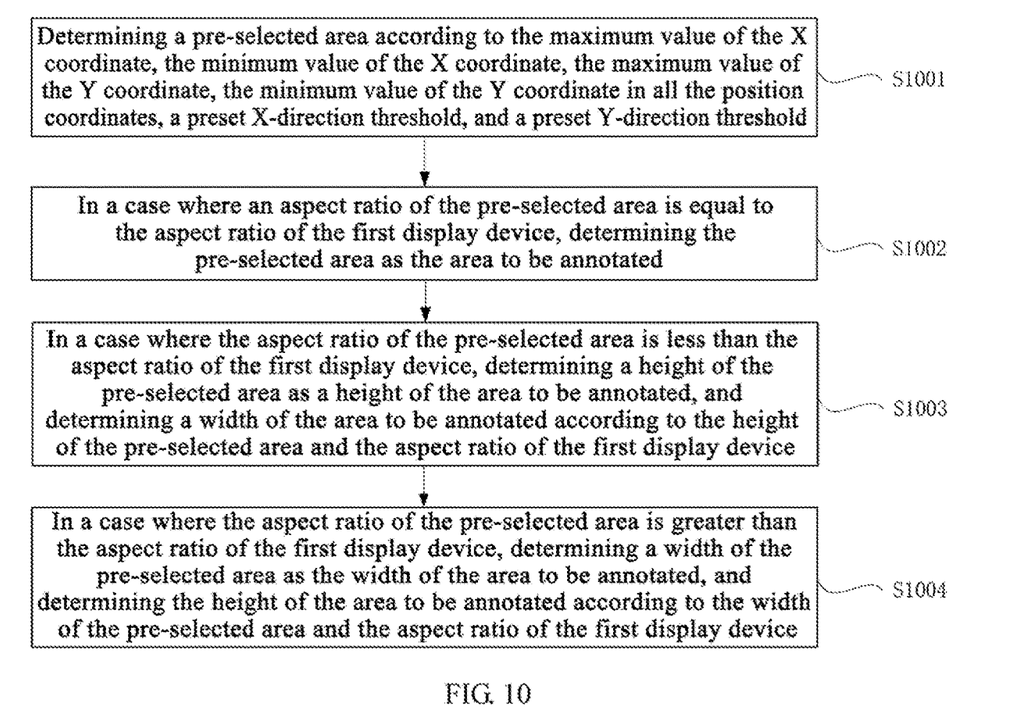
FIG. 10 is a schematic flowchart illustrating some steps of an information display method for a second display device according to an embodiment of the present disclosure.

In some embodiments, in order to better understand the information of the peripheral region, a certain threshold needs to be left in the X direction and the Y direction. Referring to FIG. 10, the step (i.e. step S802) of determining the area to be annotated according to the maximum value of the X coordinate, the minimum value of the X coordinate, the maximum value of the Y coordinate, and the minimum value of the Y coordinate in all the position coordinates, and the aspect ratio of the first display device (i.e. the ratio of the maximum value of the pixel row of the first display device to the maximum value of the pixel column of the first display device), may specifically include steps S1001, S1002, S1003, and S1004.

In step S1001, determining a pre-selected area according to the maximum value of the X coordinate, the minimum value of the X coordinate, the maximum value of the Y coordinate, the minimum value of the Y coordinate in all the position coordinates, a preset X-direction threshold, and a preset Y-direction threshold;

In step S1002, in a case where an aspect ratio of the pre-selected area is equal to the aspect ratio of the first display device, determining the pre-selected area as the area to be annotated;

In step S1003, in a case where the aspect ratio of the pre-selected area is less than the aspect ratio of the first display device, determining a height of the pre-selected area as a height of the area to be annotated, and determining a width of the area to be annotated according to the height of the pre-selected area and the aspect ratio of the first display device;

In step S1004, in a case where the aspect ratio of the pre-selected area is greater than the aspect ratio of the first display device, determining a width of the pre-selected area as the width of the area to be annotated, and determining the height of the area to be annotated according to the width of the pre-selected area and the aspect ratio of the first display device.

For example, in step S1001, as shown in FIG. 9, a rectangle (a rectangle of a dashed box in FIG. 9) determined by the maximum value of the X coordinate, the minimum value of the X coordinate, the maximum value of the Y coordinate, and the minimum value of the Y coordinate may be increased by a preset X-direction threshold in the X direction, and a preset Y-direction threshold in the Y direction.

The maximum value of the X coordinate, the minimum value of the X coordinate, the maximum value of the Y coordinate and the minimum value of the Y coordinate of the position coordinates corresponding to the pre-selected area in the first coordinate system may be determined according to the following formulas:

If $X_{min} - X_{threshold} >= 0$, then $X_1 = X_{min} - X_{threshold}$;

if $X_{min} X_{threshold} < 0$, then $X_1 = 0$;

If $X_{max} + X_{threshold} <= X_{height}$, then $X_2 = X_{max} + X_{threshold}$;

if $X_{max} + X_{threshold} > X_{height}$, then $X_2 = X_{height}$;

If $Y_{min} - Y_{threshold} >= 0$, then $Y_1 = Y_{min} - Y_{threshold}$;

if $Y_{min} - Y_{threshold} < 0$, then $Y_1 = 0$;

If $Y_{max} + Y_{threshold} <= Y_{width}$, then $Y_2 = Y_{max} + Y_{thresold}$;

if $Y_{max} + Y_{threshold} > Y_{width}$, then $Y_2 = Y_{width}$;

Where $X_{min}$, $X_{max}$, $Y_{min}$, and $Y_{max}$ are the minimum value of the X coordinate, the maximum value of the X coordinate, the minimum value of the Y coordinate and the maximum value of the Y coordinate in all the position coordinates corresponding to the plurality of positions of the cursor in the first coordinate system, respectively;

$X_1$, $X_2$, $Y_1$, and $Y_2$ are an minimum value of the X coordinate, an maximum value of the X coordinate, a minimum value of the Y coordinate and a maximum value of the Y coordinate of position coordinates corresponding to the area to be annotated in the first coordinate system, respectively, which may form a new rectangle (a rectangle of the largest solid-line box in FIG. 9), and the rectangular area is an area on which the pre-selection is performed.

$X_{threshold}$ is the preset X-direction threshold, $Y_{threshold}$ is the preset Y-direction threshold, and both $X_{threshold}$ and $Y_{threshold}$ are positive integers. $X_{height}$ is a height of the second display device ($X_{height}$=2160, taking a 4K screen as an example), and $Y_{width}$ is a width of the second display device ($Y_{width}$=3840, taking a 4K screen as an example).

In step S1002, the pre-selected area has the same aspect ratio as that of the first display device, and therefore, the pre-selected area may be directly determined as the area to be annotated.

In step S1003, the height of the pre-selected area is determined to be the height of the area to be annotated. That is, a size in the X direction remains unchanged, and a size in the Y direction is changed, so that the determined area to be annotated has the same aspect ratio as that of the first display device. The width of the area to be annotated may be determined according to the following formula:

$$\text{Width} = Y_2 - Y_1 + Y_{complement};$$

Where $Y_{complement}=(X_2-X_1)\times R_{first\ display\ device}-(Y_2-Y_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of position coordinates corresponding to the area to be annotated in the first coordinate system, respectively.

In step S1004, the width of the pre-selected area is determined as the width of the area to be annotated. That is, a size in the Y direction is kept unchanged, and a size in the X direction is changed, so that the determined area to be annotated has the same aspect ratio as that of the first display device. The height of the area to be annotated may be determined according to the following formula:

$$\text{Height} = X_2 - X_1 + X_{complement};$$

Where $X_{complement}=(Y_2-Y_1)/R_{first\ display\ device}-(X_2-X_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of the position coordinates corresponding to the area to be annotated in the first coordinate system, respectively.

Figure 11:
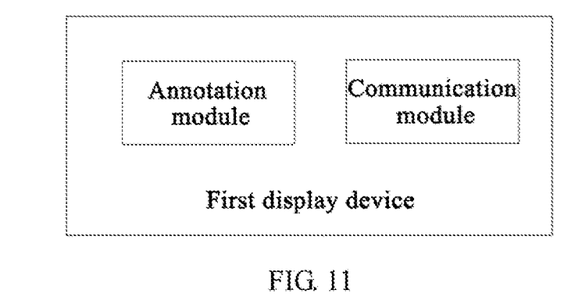
FIG. 11 is a block diagram of a first display device according to an embodiment of the present disclosure.

FIG. 11 is a block diagram of a first display device according to an embodiment of the present disclosure.

Referring to FIG. 11, an embodiment of the present disclosure provides a first display device including:

an annotation module, which is configured to display annotation information corresponding to content to be annotated, in response to an annotation operation for the content to be annotated, in a case where the first display device displays the content to be annotated; and a communication module, which is configured to send the annotation information to the second display device, so that the second display device displays the annotation information in an area corresponding to the content to be annotated.

Figure 12:
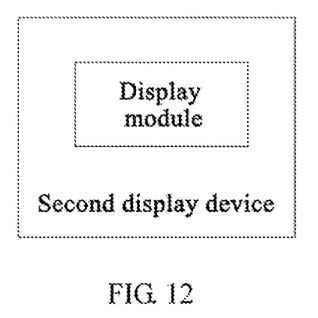
FIG. 12 is a block diagram of a second display device according to an embodiment of the present disclosure.

FIG. 12 is a block diagram of a second display device according to an embodiment of the present disclosure.

Referring to FIG. 12, an embodiment of the present disclosure provides a second display device including:

a display module, which is configured to display the annotation information in the area corresponding to the content to be annotated on the second display device, in response to the annotation information, which is for the content to be annotated and sent by the first display device, where the content to be annotated is content of a partial area in the full-area display content of the second display device.

Figure 13:
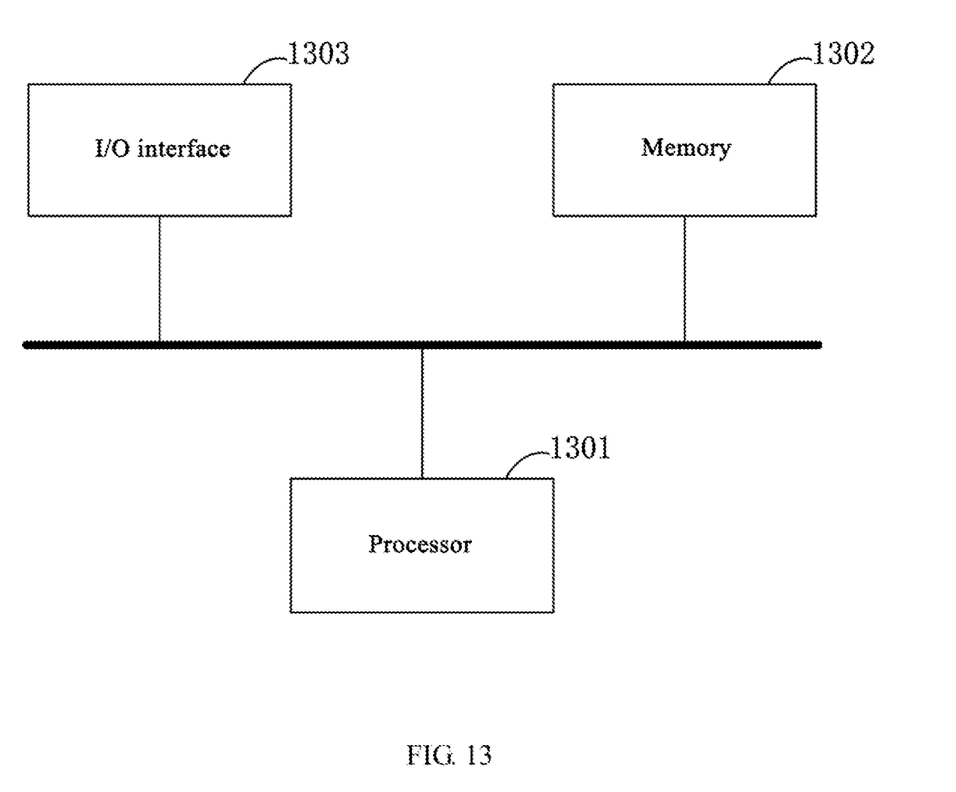
FIG. 13 is a block diagram of an electronic device according to an embodiment of the present disclosure.

FIG. 13 is a block diagram of an electronic device according to an embodiment of the present disclosure.

Referring to FIG. 13, an embodiment of the present disclosure provides an electronic device including: at least one processor 1301; at least one memory 1302, and one or more I/O interfaces 1303 connected between the processor 1301 and the memory 1302. The memory 1302 stores one or more computer programs that may be executable by the at least one processor 1301. The one or more computer programs are executed by the at least one processor 1301, so that the at least one processor 1301 can perform the information display method for the first display device and/or the information display method for the second display device, which are described above.

An embodiment of the present disclosure further provide a computer-readable storage medium with a computer program stored thereon, when executed by a processor/processing core, the computer program implements the information display method for a first display device and/or the information display method for a second display device, which are described above. The computer-readable storage medium may be a volatile or non-volatile computer-readable storage medium.

An embodiment of the present disclosure further provide a computer program product, which includes computer-readable code or a non-volatile computer-readable storage medium carrying the computer-readable code. When the computer-readable code runs in a processor of an electronic device, the processor in the electronic device executes the information display method for a first display device and/or information display method for a second display device, which are described above.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer-readable storage medium, which may include a computer storage medium (a non-transitory medium) and a communication medium (a transitory medium).

As is well known to one of ordinary skill in the art, the term "computer storage medium" includes volatile and nonvolatile, removable and non-removable media implemented in any method or technology for storage of information (such as computer-readable program instructions, data structures, program modules or other data). The computer storage medium includes, but is not limited to, random access memory (RAM), read-only memory (ROM), erasable programmable read-only memory (EPROM), static random access memory (SRAM), flash memory or other memory technologies, portable compact disc read-only memory (CD-ROM), digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer-readable program instructions, data structures, program modules or other data in a modulated data signal such as a carrier wave or other transport mechanism, and includes any information delivery medium.

The computer-readable program instructions described herein may be downloaded from a computer-readable storage medium to a respective computing/processing device, or to an external computer or external storage device through a network, such as the internet, a local area network, a wide area network, and/or a wireless network. The network may include copper transmission cables, fiber optic transmission, wireless transmission, routers, firewalls, switches, gateway computers and/or edge servers. The network adapter card or network interface in each computing/processing device receives the computer-readable program instructions from the network and forwards the computer-readable program instructions for storage in a computer-readable storage medium in the respective computing/processing device.

Computer program instructions for executing operations of the present disclosure may be assembler instructions, instruction set architecture (ISA) instructions, machine instructions, machine-related instructions, microcode, firmware instructions, state setting data, or source or object code written in any combination of one or more programming languages, including an object oriented programming language such as Smalltalk, C++ or the like and a conventional procedural programming language, such as "C" programming language or a similar programming language. The computer-readable program instructions may execute entirely on the user's computer, partly on the user's computer, as a stand-alone software package, partly on the user's computer and partly on a remote computer, or entirely on the remote computer or server. In a case involving the remote computer, the remote computer may be connected to the user's computer through any type of network, including a local area network (LAN) or a wide area network (WAN), or connected to an external computer (for example, through the internet provided by an internet service provider). In some embodiments, various aspects of the present disclosure are implemented by personalizing an electronic circuit, which can execute the computer-readable program instructions, such as a programmable logic circuit, a field programmable gate array (FPGA), or a programmable logic array (PLA), by means of state information of the computer-readable program instructions.

The computer program product described herein may be embodied in hardware, software, or a combination thereof. In an alternative embodiment, the computer program product is embodied in a computer storage medium. In another alternative embodiment, the computer program product is embodied in a software product, such as a software development kit (SDK) or the like.

Various aspects of the present disclosure are described herein with reference to flowcharts and/or block diagrams of methods, apparatus (systems) and computer program products according to the embodiments of the present disclosure. It will be understood that each block in the flowchart and/or the block diagram, and combinations of blocks in the flowchart and/or the block diagram, can be implemented by computer-readable program instructions.

These computer-readable program instructions may be provided to a processor of a general purposed computer, a special purposed computer, or other programmable data processing apparatus to produce a machine, such that the instructions, when executed by the processor of the computer or other programmable data processing apparatus, create an apparatus implementing the functions/acts specified in one or more blocks in the flowchart and/or the block diagram. These computer-readable program instructions may alternatively be stored in a computer-readable storage medium, and theses instructions can direct a computer, programmable data processing apparatus, and/or other devices to function in a particular manner, such that the computer-readable medium storing the instructions includes a manufacture including instructions which implement various aspects of the functions/acts specified in one or more blocks in the flowchart and/or the block diagram.

The computer-readable program instructions may alternatively be loaded onto a computer, other programmable data processing apparatuses, or other devices to execute a series of operation steps on the computer, other programmable apparatuses or other devices, to produce a computer implemented process, such that the instructions which are executed on the computer, other programmable apparatuses or other devices implement the functions/acts specified in one or more blocks the flowchart and/or the block diagram.

The flowcharts and the block diagrams in the drawings illustrate architecture, functionality, and operation of possible implementations of systems, methods and computer program products according to various embodiments of the present disclosure. In this regard, each block in the flowchart or the block diagram may represent a module, a program segment, or a portion of instructions, which includes one or more executable instructions for implementing the specified logical function(s). In some alternative implementations, the functions noted in the block may occur in an order different from that noted in the figure. For example, two blocks shown in succession may, in fact, be executed substantially concurrently, or the blocks may sometimes be executed in the reverse order, depending upon the functionality involved. It should also be noted that each block in the block diagram and/or the flowchart, and combinations of blocks in the block diagram and/or the flowchart, may be implemented by a hardware-based system of a special purpose that executes the specified functions or acts, or implemented by a combination of a special purposed hardware and the computer instructions.

Example embodiments have been disclosed herein, and although specific terms are employed, they are used and should be interpreted in a generic and descriptive sense only and not for purposes of limitation. In some instances, as is apparent to one of ordinary skill in the art, features, characteristics and/or elements described in connection with a particular embodiment may be used alone or in combination with features, characteristics and/or elements described in connection with other embodiments, unless expressly stated otherwise. Therefore, it will be understood by one of ordinary skill in the art that various changes in form and details may be made without departing from the scope of the present disclosure as set forth in the appended claims.

What is claimed is:

1. An information display method for a second display device, comprising:
  displaying annotation information in an area corresponding to content to be annotated on the second display device, in response to the annotation information for the content to be annotated, which annotation information is sent by a first display device, wherein the content to be annotated is content of a partial area in full-area display content of the second display device,
  wherein before the displaying the annotation information in the area corresponding to the content to be annotated on the second display device, in response to the annotation information for the content to be annotated, which annotation information is sent by the first display device, the method further comprises:
  displaying the full-area display content;
  in a case where a selection cursor is triggered, acquiring a plurality of display positions of the selection cursor in a first time period;
  determining an area to be annotated according to the plurality of display positions of the selection cursor, and taking display content in the area to be annotated as the content to be annotated; and
  sending the content to be annotated to the first display device, so that the first display device displays the content to be annotated,
  wherein the selection cursor is a cursor displayed on the second display device and controlled by a controller, the controller is used for controlling the display position of the selection cursor on the second display device, the controller comprises a selection state, and the first time period is a time period between a start moment and an end moment of the selection state of the controller.

2. The method according to claim 1, wherein the determining the area to be annotated according to the plurality of display positions of the selection cursor, comprises:
  acquiring position coordinates in a first coordinate system corresponding to the plurality of display positions of the selection cursor, wherein an X direction of the first coordinate system is a column direction of pixels of the second display device, and a Y direction of the first coordinate system is a row direction of pixels of the second display device; and
  determining the area to be annotated according to a maximum value of an X coordinate, a minimum value of the X coordinate, a maximum value of a Y coordinate, and a minimum value of the Y coordinate in all the position coordinates, and an aspect ratio of the first display device.

3. The method according to claim 2, wherein the determining the area to be annotated according to the maximum value of the X coordinate, the minimum value of the X coordinate, the maximum value of the Y coordinate, and the minimum value of the Y coordinate in all the position coordinates, and the aspect ratio of the first display device, comprises:
  determining a pre-selected area according to the maximum value of the X coordinate, the minimum value of the X coordinate, the maximum value of the Y coordinate and the minimum value of the Y coordinate in all the position coordinates, a preset X-direction threshold and a preset Y-direction threshold;
  in a case where an aspect ratio of the pre-selected area is equal to the aspect ratio of the first display device, determining the pre-selected area as the area to be annotated;
  in a case where the aspect ratio of the pre-selected area is less than the aspect ratio of the first display device, determining a height of the pre-selected area as a height of the area to be annotated, and determining a width of the area to be annotated according to the height of the pre-selected area and the aspect ratio of the first display device; and
  in a case where the aspect ratio of the pre-selected area is greater than the aspect ratio of the first display device, determining a width of the pre-selected area as the width of the area to be annotated, and determining the height of the area to be annotated according to the width of the pre-selected area and the aspect ratio of the first display device.

4. The method according to claim 3, wherein the determining the pre-selected area according to the maximum value of the X coordinate, the minimum value of the X coordinate, the maximum value of the Y coordinate, and the minimum value of the Y coordinate of all the position coordinates, the preset X-direction threshold and the preset Y-direction threshold, comprises:
  determining the maximum value of the X coordinate, the minimum value of the X coordinate, the maximum value of the Y coordinate and the minimum value of the Y coordinate of the position coordinates corresponding to the pre-selected area in the first coordinate system, according to the following formulas:

if $X_{min} - X_{threshold} >= 0$, then $X_1 = X_{min} - X_{threshold}$;

if $X_{min} - X_{threshold} < 0$, then $X_1 = 0$;

if $X_{max} + X_{threshold} <= X_{height}$, then $X_2 = X_{max} + X_{threshold}$;

if $X_{max} + X_{threshold} > X_{height}$, then $X_2 = X_{height}$;

if $Y_{min} - Y_{threshold} >= 0$, then $Y_1 = Y_{min} - Y_{threshold}$;

if $Y_{min} - Y_{threshold} < 0$, then $Y_1 = 0$;

if $Y_{max} + Y_{threshold} <= Y_{width}$, then $Y_2 = Y_{max} + Y_{threshold}$;

if $Y_{max} + Y_{threshold} > Y_{width}$, then $Y_2 = Y_{width}$, wherein $X_{min}$, $X_{max}$, $Y_{min}$, and $Y_{max}$ are the minimum value of the X coordinate, the maximum value of the X coordinate, the minimum value of the Y coordinate and the maximum value of the Y coordinate in all the position coordinates corresponding to the plurality of display positions of the selection cursor in the first coordinate system, respectively;
  $X_1$, $X_2$, $Y_1$, and $Y_2$ are an minimum value of the X coordinate, an maximum value of the X coordinate, a minimum value of the Y coordinate and a maximum value of the Y coordinate of position coordinates corresponding to the area to be annotated in the first coordinate system, respectively; and
  $X_{threshold}$ is the preset X-direction threshold, $Y_{threshold}$ is the preset Y-direction threshold, and both Xthreshold and $Y_{threshold}$ are positive integers; $X_{height}$ is a height of the second display device, and $Y_{width}$ is a width of the second display device.

5. The method according to claim 3, wherein in the case where the aspect ratio of the pre-selected area is less than the aspect ratio of the first display device, the determining the height of the pre-selected area as the height of the area to be annotated, and determining the width of the area to be annotated according to the height of the pre-selected area and the aspect ratio of the first display device, comprises:

determining the width of the area to be annotated according to the following formula:

$$\text{Weight} = \text{Width} = Y_2 - Y_1 + Y_{complement};$$

wherein $Y_{complement}=(X_2-X_1)\times R_{first\ display\ device}-(Y_2-Y_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of position coordinates corresponding to the area to be annotated in the first coordinate system, respectively.

6. The method according to claim 3, wherein in a case where the aspect ratio of the pre-selected area is greater than the aspect ratio of the first display device, determining the width of the pre-selected area as the width of the area to be annotated, and determining the height of the area to be annotated according to the width of the pre-selected area and the aspect ratio of the first display device, comprises:

determining the height of the area to be annotated according to the following formula:

$$\text{Height} = X_2 - X_1 + X_{complement};$$

wherein $Y_{complement}=(Y_2-Y_1)/R_{first\ display\ device}-(X_2-X_1)$; $R_{first\ display\ device}$ is the aspect ratio of the first display device; and $X_1$, $X_2$, $Y_1$, and $Y_2$ are the minimum value of the X coordinate, the maximum value of the X coordinate, the minimum value of the Y coordinate and the maximum value of the Y coordinate of the position coordinates corresponding to the area to be annotated in the first coordinate system, respectively.

7. The method according to claim 1, wherein the controller controls the position of the selection cursor on the second display device by means of infrared or bluetooth, the controller is provided with a button, and when the button is pressed, the controller is in the selection state.

8. An electronic device, comprising:
at least one processor; and
a memory communicating with and connected to the at least one processor,
wherein the memory stores one or more computer programs executable by the at least one processor, and when the one or more computer programs are executed by the at least one processor, the at least one processor performs the information display method according to claim 1.

9. A non-transitory computer-readable storage medium with a computer program stored thereon, wherein when the computer program is executed by a processor, the computer program implements the information display method according to claim 1.

* * * * *